Aug. 1, 1933.  A. GODEL  1,920,172
ACTIVATION OF CARBONACEOUS SUBSTANCES
Filed Aug. 11, 1930
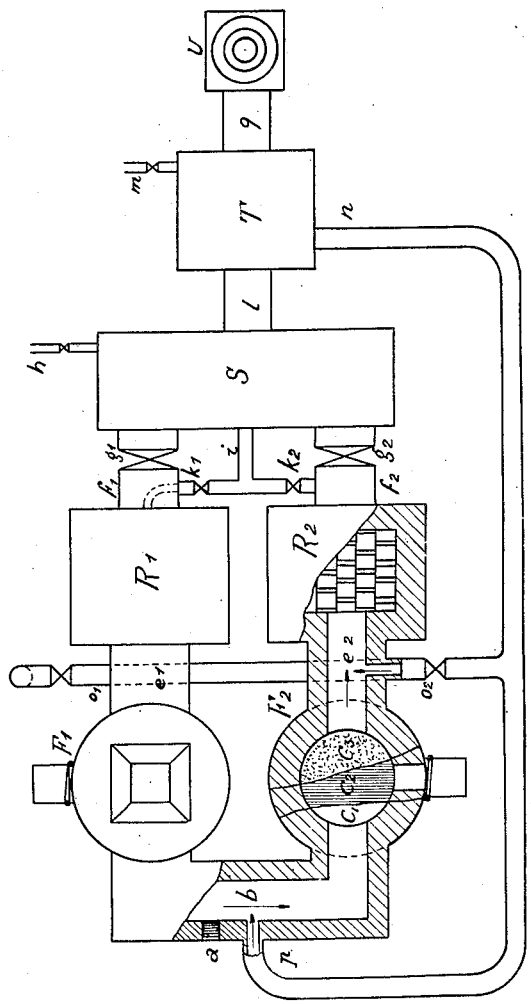

Patented Aug. 1, 1933

1,920,172

UNITED STATES PATENT OFFICE 1,920,172

ACTIVATION OF CARBONACEOUS SUBSTANCES

Albert Godel, Paris, France, assignor to Société De Recherches & D'Exploitations Petroliferes, Paris, France, a Société Anonyme of France Application August 11, 1930, Serial No. 474,628, and in France September 9, 1929

5 Claims. (Cl. 252—3.)

The present invention relates to a process for the activation of carbonaceous materials by diffusion of activating gases at high temperature, by the use of two or more furnaces or retorts in combination, in such a way that the combined group thus provided permits an acceleration of the activation reactions, due to a judicious use of the heating gases and activating gases, as well as a considerable economy in heating, by reason of the production of activation gases of high calorific value and to their immediate utilization in a particularly efficacious manner.

It is customary to prepare active absorbent or decolorizing carbons by submitting carbonaceous substances to the action of the activating gases at high temperature, either by direct passage of activating and heating gases through the mass, or by the intermediary of porous or apertured diaphragms.

The carbonaceous materials subjected to this activation treatment may be crude substances, such as wood, or waste of any vegetable or animal matter, peat, lignite, anthracite, etc., or the same substances after they have undergone a more or less complete carbonization. There may likewise be added to them or not chemical substances favouring the activation or they may have undergone an agglomeration by various means.

The present invention is characterized by the combination of the employment of two or more furnaces or retorts or groups of furnaces or retorts in which the treatment of the materials is carried out in alternate phases of heating and activation, one or more of the furnaces being at the heating phase while another or others is or are at the activation phase, and the furnace or groups being reversed at intervals, and the gases evolved the activation stage being utilized for the heating of the other furnace or group of furnaces.

There has been described in my copending application Serial No. 473,012 filed Aug. 4, 1930, "Activation of carbonaceous substances" the principle of the operation of activation furnaces or retorts with alternate phases of heating and activation, each of these two operations taking place separately with gases of different compositions and properly suited to the objects to be fulfilled.

The present invention allows inter alia, due to the combination of two furnaces or retorts operating according to the principle enunciated above, and of which one is at the heating phase while the other is at the activation phase, an immediate utilization while still hot of the combustible gases evolved in the furnace at the activation phase, preferably after combustion with the desired quantity of pre-heated air, in order to heat the furnace at the heating stage.

It is thus possible to carry out the heating of furnaces in the majority of cases without any supplementary supply of fuel, or at least with a very small supply, which leads to a particularly economical operation.

In this way the carbonaceous material during its stay in the activation furnace, undergoes an uninterrupted treatment with heating and activating gases alternately, until it has attained the desired degree of activity.

Moreover, according to the present invention, the heating gases which have served for the heating of the carbonaceous material in the furnaces and which contain a certain quantity of combustible gases, due to the reducing effect of the carbonaceous materials upon the said gases, may be burnt with a small quantity of air and serve for the heating of heat regenerators, being then passed into any suitable apparatus for the recovery of waste heat, such as steam superheaters, heaters for air or various gases, evaporative apparatus, etc., certain of these apparatus being in particular intended for carrying out the superheat to high temperature of the activating gases sent into the furnace at the activation stage.

Upon the accompanying drawing, to which reference is made in the subsequent description, there have been represented by way of example two furnaces or retorts combined in accordance with the principles of the present invention as set out above.

The drawing represents in plan, with partial sections, a group comprising independent activation furnaces having a direct passage of activating or heating gases through the mass of carbonaceous material.

In the group represented, the two separate activation furnaces $F_1$ $F_2$ are connected together at their lower parts by a flue or passage $b$ serving to conduct the combustible gases leaving the furnace at the activation stage to the furnace at the heating stage. To obtain the fullest heating effect, there is admitted through the pipe $p$ the quantity of air required for completing the combustion of these gases.

The furnace $F_2$ is represented in section along three different horizontal cross-sections:

$C_1$ is a partial section of the base of the furnace at the level of the passage $b$.

$C_2$ is a partial section, at the level of the grid supporting the carbonaceous material and the discharge door.

$C_3$ is a partial section of the upper portion of the furnace, at the level of the passage for the exit of the gases, to which reference will be made hereafter.

Upon the furnace $F_1$, represented diagrammatically in plan, there is indicated a charging hopper.

The furnaces $F_1$ $F_2$ are connected respectively at their upper parts by passages $e_1$ $e_2$ to two heat regenerators $R_1$ $R_2$. These regenerators $R_1$ $R_2$ are of the normal type with an interior filling of refractory bricks, or any other suitable material adapted to effect a storage of the heat.

The regenerators $R_1$ $R_2$ are connected to a steam superheater S by passages $f_1$ $f_2$ each provided with a valve $g_1$ $g_2$.

The superheater S receives steam from a boiler through a pipe $h$. This steam after being superheated leaves again through a pipe $i$ which is divided into two branches $k_1$, $k_2$ each provided with a valve and leading respectively into the passages $f_1$, $f_2$ between the valves $g_1$, $g_2$ and the regenerators $R_1$, $R_2$.

The superheater S is connected by a passage $l$ to an air heater T after which the burnt gases may be conducted through a flue $q$ to a chimney U.

The air heater T receives air derived from a fan or like apparatus through a pipe $m$ and the heated air leaves through a pipe $n$ to pass on the one hand through the pipe $p$ into the flue or passage $b$ and on the other hand through the pipes $o_1$ $o_2$, each provided with a valve, into the passages $e_1$ $e_2$.

The operation of the whole group of apparatus according to the present invention is as follows:—

Supposing that the furnace or retort $F_1$ is at the activation stage, and the furnace or retort $F_2$ at the heating stage, activation gases of high calorific value leave the furnace $F_1$ through the passage $b$ following the arrow; these gases are burnt by mixture with the air entering through the pipe $p$ and they pass into the furnace $F_2$, in traversing which they give up a portion of their heat to the carbonaceous material.

In the case where the quantity of combustible gases derived from the furnace $F_1$ may possibly be insufficient, there may be admitted by means of a burner of any kind (for example, a gas burner, fuel-oil burner, etc.), arranged in a suitable orifice, such as $a$, formed in the wall of the flue or passage $b$, a supplementary quantity of gas in combustion or burnt gases at very high temperature.

A burner of this kind may further be utilized with advantage during the starting up of the group or after stoppage, but in normal working when the quantity of gas is sufficient, the orifice $a$ can be stopped off, as is shown in the drawing.

The combustion gases, rendered highly reducing as a result of their passage into the furnace $F_2$ in contact with the carbonaceous material, are burnt in the passage $e_2$ by reason of the admission of a small quantity of air through the pipe $o_2$. The gases reheated in this way traverse the regenerator $R_2$, where they give up a portion of their heat to the refractory stacks, then leaving the regenerator by the passage $f_2$ they pass through the valve $g_2$ which must be open during this phase and enter the superheater S, thence passing to the air heater T and to the chimney U.

On the other hand, the valve $g_1$ being closed, the steam leaving the superheater S through the pipe $i$ is led upon opening the valve in the pipe $k_1$ into the passage $f_1$. This steam which has undergone an initial superheat in the superheater S, passes through the stack of bricks in the previously heated regenerator $R_1$, where it is raised to a temperature substantially equal to that which exists in the working chamber of the furnace, and thence it travels along the pipe $e_1$ into the furnace $F_1$; it passes through this furnace where it is partially decomposed, activating the carbonaceous material, and leaves at the lower part transformed into combustible gases composed mainly of hydrogen and carbon monoxide diluted with a small quantity of carbonic acid gas and steam which has not entered into reaction. This gas is burnt in the flue or passage $b$ together with the air entering from the pipe $p$, as has been explained already, in order to serve for the heating of the furnace $F_2$.

When by reason of the endothermic reactions of the activation, the temperature has fallen too low in the furnace $F_1$, for the activation to be produced in satisfactory conditions, and simultaneously the furnace $F_2$ has been heated up to a sufficient temperature, an inversion of the gases is carried out.

For this purpose the valve $g_2$ and the valve controlling the pipes $k_1$ $o_2$ are closed, while the valve $g_1$ and the valves controlling the pipes $k_2$ $o_1$ are opened; thus the superheated steam introduced through the pipe $k_2$ into the channel $f_2$ traverses the regenerator $R_2$, the passage $e_2$ and the furnace $F_2$, in which an activation phase is taking place, in the opposite direction to that of the combustion gases in the preceding stage.

The gases leaving $F_2$ are burnt in the passage $b$ together with the air introduced at $p$, and serve for the heating of the furnace $F_1$ which is then at the heating stage. These gases leave through the passage $e_1$ where the combustible elements are burnt up together with the air introduced through the pipe $o_1$; they then traverse the regenerator $R_1$, the passage $f_1$, the valve $g_1$ the superheater S, etc.

The alternation of the phases is thus repeated indefinitely, and the carbonaceous material, during its stay in the furnaces in question is thus submitted to a series of phases of activation and heating.

It will be understood that there is obtained in this manner a great acceleration of the activation reactions and a considerable economy in the heating.

The present invention is not limited to the arrangements of apparatus represented in the drawing but is naturally applicable to any different installation of the same apparatus. For example, without exceeding the scope of the invention, more than two furnaces may be combined and several regenerators utilized, and the heating gases may be supplied to any apparatus for utilizing waste heat other than those mentioned above. There may be utilized as activating gases any other gas than the steam mentioned, for example carbon dioxide gas or gaseous mixtures having a high content of steam, carbon dioxide, etc.

There has already been described an activation furnace for carbonaceous materials, in which the activation gases leaving the furnace were led into heat regenerators which served for heating up the activating gases before their introduction into the activation furnace. But in that apparatus, the operation with alternate stages of heat evolution and heat absorption only affected the regenerators, and in the working hearth of the single furnace utilized there was a continuous introduction of heating gases and activating gases in admixture. On the contrary, in the present invention, the alternation of the heating and activation phases is one of the fundamental conditions of carrying out the process and using a plurality of furnaces in combination as described above, so that the waste heat can be advantageously recovered by regenerators acting with alternate periods of absorption and evolution of heat in relation to the alternating phases of the respective furnaces with which they are constantly connected.

What I claim is:—

1. In the activation of carbonaceous materials by means of gases, the improvement which consists in combining a plurality of activation furnaces, operating each furnace on alternate phases of heating and activation, burning the combustible gases derived from a furnace at the activation stage, passing said gases after burning into a furnace at the heating stage, and changing the direction of said gases simultaneously with the change of phase of said furnaces.

2. A process for the activation of carbonaceous material by means of gases, comprising the heating of activating gases in a regenerator, the passing of said heated activating gases into a furnace to react with said carbonaceous material, the burning of combustible activation gases derived from said furnace, the passing of said gases after burning into another furnace containing carbonaceous material, the heating of the material in said second furnace by said burnt gases, and the utilization of a portion of the heat contained in the gases leaving said second furnace for the heating of a second regenerator, the phases of said furnaces being changed over periodically, and the direction of the gases being changed substantially simultaneously to pass the activating gases through said second regenerator into said second furnace, the burnt activation gases from said second furnace into said first furnace for the reheating of the material therein, and the gases from said first furnace into the first regenerator.

3. A process for the activation of carbonaceous material by means of gases, comprising the heating of activating gases in a regenerator, the passing of said heated activating gases into a furnace to react with said carbonaceous material, the introduction of air for the burning of combustible activation gases derived from said furnace, the passing of said gases after burning into another furnace containing carbonaceous material, the heating of said material by said gases, the introduction of air for the burning of combustible reducing gases derived from said second furnace, the utilization of a portion of the heat contained in the gases leaving said second furnace for the heating of a second regenerator, and the utilization of the waste-heat contained in the gases leaving said second regenerator for the heating of said air, the phases of said furnaces being changed over periodically with a substantially simultaneous change of the direction of said activating and activation gases, a reversal of the heat flow in said regenerators, utilization of the waste-heat in the gases leaving the first mentioned regenerator, and the introduction of air for the burning of combustible reducing gases derived from the first mentioned furnace.

4. A process for the activation of carbonaceous material by means of gases, comprising the successive heating and activation of one and the same batch of carbonaceous material, the passing of the activation gases derived from the activation of said batch into a second batch of carbonaceous material, the heating of said second batch by said activation gases from the first batch, and the utilization of the heat contained in the gases leaving said second batch of carbonaceous material.

5. A process for the activation of carbonaceous material by means of gases, comprising the heating and activation of a first batch of carbonaceous material, the passing of the activation gases derived from the activation of said first batch into a second batch of carbonaceous material, the heating of said second batch by said activation gases, the activation of said second batch of carbonaceous material by activating gases, the passing of the activation gases derived from the activation of said second batch into said first batch of carbonaceous material, the heating of said first batch by the last-mentioned activation gases, and the further activation of said first batch by activating gases.

ALBERT GODEL.